Patented Mar. 12, 1940

2,192,955

UNITED STATES PATENT OFFICE 2,192,955

USE OF AMINES WITH PIGMENTS

Clifford K. Sloan and Gordon D. Patterson, Wilmington, Del., assignors to E. I. du Pont de Nemours & Company, Wilmington, Del., a corporation of Delaware No Drawing. Application July 22, 1936, Serial No. 91,968

22 Claims. (Cl. 134—39)

This invention relates to coating compositions, particularly to compositions containing phosphotungstic acid pigments and lead pigments having improved properties and to methods for making such compositions.

Phosphotungstic acid pigments have been found considerable use in coating compositions because of their remarkable brilliance, strength, and light fastness. They are formed by the coupling of basic dyestuffs with phosphotungstic acid. They are commercially available in a number of colors such as blue, red, and green, the color depending largely upon the nature of the basic dyestuff component. The blues are able to compete successfully with the comparatively cheap iron blue pigments. Although these pigments have been used to some extent in printing inks, it is desirable that their use be expanded in this field and that use should be made in the wider paint and enamel fields.

The working properties of phosphotungstic acid pigments in oil systems have been unsatisfactory because of the lack of flow of pigmented compositions containing them. This characteristic has prevented a more general use of this valuable class of pigments. Thus, many members of this group give printing inks having low fluidity when ground in lithographic varnish, the false bodied character preventing satisfactory feeding on the printing rolls. In paints and enamels false body due to the flocculated condition of the pigment, exhibits itself in films of low gloss, and in the presence of undesirable brush marks. The stiff character of the mill bases prevents building up of pigment content, thus preventing full use of the inherent strength of the phosphotungstic acid pigments.

Pigments capable of reacting in a coating composition with the free acids thereof are classed as reactive pigments. It is supposed that traces of basic lead compounds in lead pigments react with the acids and that this reaction is responsible for the thickening or livering of lead-pigmented compositions on storage, but the invention is not necessarily restricted to this theory. Inasmuch as various coating compositions contain different free acids, it is to be expected that the reactivity of a pigment will vary somewhat with the particular vehicle composition. Those familiar with pigments used in coating compositions generally class such pigments as chrome yellows, litharge, red lead, and basic lead chromate as reactive or basic pigments since their main or minor component is basic in character and will react with acids of the vehicle. This reaction is believed to be responsible for the thickening that often occurs on storage of such pigments in certain vehicle systems. Typical cases of such livering action include printing inks containing chrome yellow pigments where relatively short periods of storage of the pigmented compositions render the materials unfit for use. Metal protective paints containing red lead similarly thicken up or harden on storage, presumably due to reaction between the vehicles, acids and the basic components of red lead.

This invention has as an object the bringing about of a marked improvement in the working properties of compositions pigmented with phosphotungstic acid pigments. Another object is to improve the fluidity of compositions, particularly those pigmented compositions containing pigments with basic lead components. A further object is the prevention of thickening and livering of lead pigmented compositions upon storage. A further object is to increase the pigment content of mill bases containing these pigments. A still further object is the improvement in the appearance of films containing these pigments. These and other objects of the invention will be apparent from the following description.

These objects are attained generally in accordance with the invention by incorporating an amine into the coating composition. More particularly the invention consists in combining relatively small amounts of free amines in coating compositions containing phosphotungstic acid and lead pigments. It can be practiced by the addition of amines to the pigment, or the amine may be incorporated into a pigmented composition before, during, or after grinding. The amount of amine to be used in a particular system is dependent on the particular vehicle-pigment combination, and the degree of improvement in flowing properties desired. The preferred general working range for phosphotungstic acid pigments is from about 1% to about 8%, but in the majority of cases the desired results are obtained using 4% to 8% of the agent, based on the pigment.

For lead pigment compositions the preferred general working range is from about ¼% to about 2.0%.

Our invention comprises the use of relatively small amounts of amines in coating compositions containing reactive pigments such as chrome yellows, litharge, red lead, and basic lead chromate. The amount of amine to be used in a particular system depends on several factors including oil absorption of the pigment and the degree of improvement in flowing and non-livering characteristics desired. High absorption pigments may require as much as 8% of amine on a pigment basis. Inasmuch as most lead pigments have a low oil absorption, from 1% to 2% of agent usually suffices. Low absorption materials such as chrome yellows may require considerably less, even as low as ¼% of an amine having a positive effect in retarding livering of a printing ink containing a chrome yellow pigment. It is obvious that the amount used is dependent on the magnitude of flowing and resistance to livering desirable, keeping in mind possible injurious effects of too much agent on other properties such as light fastness and drying.

The following examples will serve to illustrate how the invention is practiced, it being understood that the invention is not restricted to the illustrations.

*Example I*

95 parts of phosphotungstic acid toner obtained from the dyestuff known commercially as Victoria Pure Blue BO, and 5 parts of diphenyl guanidine were thoroughly blended by grinding together in the dry state.

*Example II*

100 parts of the pigment composition prepared in accordance with Example I was made into a printing ink by grinding it with 150 parts of a bodied linseed oil vehicle, namely, a lithographic varnish commercially known as Carter's No. 3 Regular. The resultant ink had remarkably good flowing properties, whereas an ink prepared in a similar manner, except that the pigment did not contain diphenyl guanidine, had inferior flowing properties.

*Example III*

A printing ink containing the phosphotungstic acid toner prepared from the dyestuff known commercially as Victoria Pure Blue BO was made by mixing 8 parts of tetrahydro-beta-naphthylamine with 100 parts of the pigment and 150 parts of the lithographic varnish used in Example II. This mixture was then given a printing ink grind on a roller mill. The resultant ink had excellent flowing properties which were superior to a printing ink prepared without the amine.

*Example IV*

5 parts of diphenyl guanidine was thoroughly blended with 95 parts of the phosphotungstic acid toner prepared from the dyestuff known commercially as Rhodamine 6 G DN by grinding them together in the dry state. The resultant pigment had the dry appearance of an untreated toner.

*Example V*

A printing ink was made by grinding on a three roller mill 100 parts of the pigment prepared in accordance with Example IV with 150 parts of a slightly bodied linseed oil vehicle, namely, a lithographic varnish, commercially known as Carter's No. 1 Regular. This ink exhibited remarkable flowing properties, the same being a marked improvement over a similar ink made from pigment containing no diphenyl guanidine.

*Example VI*

A chrome yellow pigment otherwise very prone to livering is made highly resistant to livering by blending one part by weight of propylene diamine with one hundred parts of chrome yellow. This is advantageously done by giving a dried press cake of chrome yellow a preliminary pass through a pulverizer after which it is sprayed with a 70% solution of propylene diamine in water, using enough of this solution to give a final agent content of one per cent on the pigment. Most of the added moisture is removed during subsequent pulverization of the treated pigment. The resultant product is highly resistant to livering when ground in coating composition systems. When ground with one third of its weight of lithographic varnish, a printing ink is obtained that remains in good condition for at least a year's can storage whereas a similar ink prepared with the untreated chrome yellow livers up badly within a few days. Incidentally, the freshly prepared ink has better flowing properties if the amine is present.

*Example VII*

A similar chrome yellow pigment of high resistance to livering in coating compositions is prepared by dry blending one part by weight of diphenyl guanidine and one hundred parts of medium chrome yellow pigment. Using this pigment, pigmented compositions of greater fluidity can be prepared. It is possible to prepare printing inks and paint mill bases of higher pigment content without sacrificing working properties. When such a pigment is ground with one third of its weight of a regular lithographic varnish, an ink is obtained which remains in good condition for at least a year under normal shelf storage, whereas the omission of the diphenyl guanidine gives an ink that livers up badly within a few days.

*Example VIII*

A red lead-linseed oil metal protective paint of improved can stability is prepared by grinding the following composition on a roller mill.

| | Parts |
|---|---|
| Red lead | 196 |
| Asbestine | 64 |
| Linseed oil | 95 |
| Diphenyl guanidine | 4 |

Storage of the above paint at ordinary temperatures for sixteen months shows that the settled pigment can be much more readily stirred up to give a homogeneous paint than is the case with a similar paint in which diphenyl guanidine is not present.

*Example IX*

A metal protective paint of superior properties, containing an alkyd resin and basic lead chromate, is prepared by grinding the following composition in a ball mill.

| | Parts |
|---|---|
| Basic lead chromate | 178 |
| 35% leaded zinc oxide | 45 |
| Talc | 74 |
| Diphenyl guanidine | 3 |
| Modified 52% linseed oil alkyd resin | 120 |
| Petroleum thinner | 62 |
| Drier solution (lead and manganese) | 8 |

When thinned to brushing consistency the resulting paint is stable on storage whereas a similar paint containing no diphenyl guanidine tends to "break" quickly with thickening of the vehicle.

Although the above examples illustrate the use of free amines with phosphotungstic acid pigments in printing ink vehicles, our invention is not limited thereto since other vehicles can be used. Other vehicles than those mentioned in the examples can also be used in the lead pigments to make other coating compositions. Desirable modifications containing these pigments can be brought about in coating compositions generally by the use of free amines. As examples of these modifications are mentioned drying oils, e. g., linseed, China-wood, rapeseed, etc.; bodied drying oils, e. g., heat-bodied and blown drying oils; natural and synthetic resins, e. g., rosin, ester gum, polyhydric alcohol-polycarboxylic acid resins, phenol-aldehyde resins, etc.; organic cellulose derivatives, e. g., nitrocellulose, cellulose acetate, benzyl cellulose and the like.

While the examples in which phosphotungstic acid pigments are used do not show compositions containing volatile organic solvents, it will be understood by those skilled in the art that such solvents may be used, and are desirable in systems which are to be applied at a lower viscosity than that of the pigment-binder combination. Suitable thinners are toluene, mineral spirits, as well as other volatile solvents commonly used in paint and varnish practice.

The above examples disclose the use of amines with the phosphotungstic acid toners from two basic dyestuffs. A number of other basic dyes are commonly used in the preparation of phosphotungstic acid toners, as for example Victoria Green SC, Methyl Violet, and Brilliant Green B. The treatment of these pigments with diphenyl guanidine and other amines results in remarkable improvement in the property of flow of inks containing these pigments.

The invention comprises all compositions pigmented with lead pigments as other examples of which are mentioned, litharge, white lead, and particularly those lead pigmented compositions in which the pigment contains more or less basic lead compounds.

The exact mode of addition of the amine to the components of the coating composition is immaterial, the actual method depending largely on the physical character of the amine to be incorporated and the nature of the apparatus available for such incorporation. It will be understood by those familiar with the production of coating compositions that the amine may be added either to the pigment during the latter stages of manufacture including a stage prior to drying; it may be added to a component of the vehicle, such as the oil, resin, binder, thinner, or drier; or it may be added to the pigmented composition either before mixing, during mixing, before grinding, during grinding or after grinding.

Within the scope of the term "free amine" as we use it herein we mean to include organic compounds containing at least one amino nitrogen group capable of forming salts with acids. These free amines may be primary, secondary, or tertiary, and may contain a plurality of amino groups. The monoamines may be generically represented by the formula $R_xNH_{3-x}$, wherein X is a whole number from 1 through 3, and R is a hydrocarbon radical selected from the class of alkyl, alkylol, alkenyl, aralkyl, aryl, and hydroaromatic. It is to be understood that when X is 2 or 3 the hydrocarbon radicals may be like or unlike. Examples of compounds of this class are ethyl amine, monoethanol amine, dimethyl aniline, methyl amino cyclohexane, cyclohexyl dimethyl amine, aniline, triethanol amine, isobutanol amine, tributyl amine, tetrahydronaphthylamine, etc. In place of, or in combination with, the monoamines enumerated amines containing a plurality of amino groups such as ethylene diamine, propylene diamine, hexamethylene tetramine, triethylene tetramine, etc., as well as amines containing a guanidine nucleus or a heterocyclic nucleus may be used. Examples of the latter two classes of compounds are diphenyl guanidine, di-o-tolyl guanidine, pyridine, tetramethyl piperazine, etc.

Our invention is particularly advantageous in the preparation of printing inks and paint pastes where the pigment to binder ratio is high. The improvement in the flowing properties of the pastes and compositions makes it possible to build up the pigment content thereof without sacrificing working properties. Improved flow in highly pigmented pastes is also of advantage in that mill bases can be reduced in the making of paint and enamel systems with relative ease.

As other embodiments of the invention will be suggested to those skilled in the art without departing from the spirit and scope of the invention, no limitations are intended in the annexed claims, except such as are specifically expressed or are imposed by the prior art.

We claim:

1. A free flowing pigmented composition which comprises a phosphotungstic acid toner and diphenyl guanidine.

2. A non-livering pigmented composition which comprises a lead containing pigment and a free amine having a guanidine nucleus.

3. A non-livering pigmented composition which comprises a lead containing pigment and a diphenyl guanidine.

4. A non-livering pigmented composition which comprises chrome yellow and a free amine having a guanidine nucleus.

5. A free flowing pigmented composition which comprises a phosphotungstic acid toner obtained from Victoria Pure Blue BO, diphenyl guanidine, and a binder selected from the class consisting of drying oils, natural and synthetic resins, and organic cellulose derivatives.

6. A free flowing pigmented composition which comprises a phosphotungstic acid toner obtained from Rhodamine S-G-DN, diphenyl guanidine, and a binder selected from the class consisting of drying oils, natural and synthetic resins, and organic cellulose derivatives.

7. A free flowing pigmented composition which comprises a phosphotungstic acid toner, a lithographic varnish, and diphenyl guanidine.

8. A free flowing pigmented composition which comprises a phosphotungstic acid toner, diphenyl guanidine, and a binder selected from the class consisting of drying oils, natural and synthetic resins, and organic cellulose derivatives.

9. A free flowing and non-livering pigmented composition which comprises a pigment selected from the group consisting of lead containing pigments and phosphotungstic acid toners, and a free amine containing at least one amino nitrogen group which amine is capable of forming salts with acids.

10. A free flowing pigmented composition which comprises a phosphotungstic acid toner and a free basic amine containing at least one amino nitrogen group which amine is capable of forming salts with acids.

11. A free flowing pigmented composition which comprises a phosphotungstic acid toner and a free polyamine containing at least one amino nitrogen group which amine is capable of forming salts with acids.

12. A free flowing pigmented composition which comprises a phosphotungstic acid toner, and a free aryl-amine containing at least one amino nitrogen group which amine is capable of forming salts with acids.

13. A free flowing pigmented composition which comprises a phosphotungstic acid toner and a free amine containing at least one amino nitrogen group and having a guanidine nucleus which amine is capable of forming salts with acids.

14. A free flowing pigmented coating composition comprising a phosphotungstic acid toner, a binder selected from the class consisting of drying oils, natural and synthetic resins, and organic cellulose derivatives, and a free amine containing at least one amino nitrogen group which amine is capable of forming salts with acids.

15. A free flowing pigmented coating composition which comprises a phosphotungstic acid toner, a drying oil, and a free amine containing at least one amino nitrogen group which amine is capable of forming salts with acids.

16. A free flowing pigmented coating composition which comprises a phosphotungstic acid toner, a resin, and a free amine containing at least one amino nitrogen group which amine is capable of forming salts with acids.

17. The method of increasing the flowing properties of pigmented compositions pigmented with phosphotungstic acid toners which comprises incorporating therewith a free amine containing at least one amino nitrogen group which amine is capable of forming salts with acids.

18. A free flowing pigmented composition which comprises a phosphotungstic acid toner and between about 1% and about 8%, on the basis of the pigment, of a free basic amine containing at least one amino nitrogen group which amine is capable of forming salts with acids.

19. A non-livering pigmented composition which comprises a lead containing pigment and between about ¼% and about 2%, on the basis of the pigment, of a free basic amine containing at least one amino nitrogen group which amine is capable of forming salts with acids.

20. A method of increasing livering resistance of lead containing pigmented compositions which comprises incorporating therewith a free amine containing at least one amino nitrogen group, which amine is capable of forming salts with acids.

21. A free flowing pigmented composition which comprises a phosphotungstic acid toner obtained from Victoria Blue B. O., and diphenyl guanidine.

22. A non-livering pigmented composition which comprises a lead containing pigment and a free amine containing at least one amino nitrogen group which amine is capable of forming salts with acids.

CLIFFORD K. SLOAN.
GORDON D. PATTERSON.